(12) United States Patent
Airamo et al.

(10) Patent No.: US 10,938,778 B2
(45) Date of Patent: Mar. 2, 2021

(54) ROUTE REPLY BACK INTERFACE FOR CLOUD INTERNAL COMMUNICATION

(71) Applicant: Forcepoint LLC, Austin, TX (US)

(72) Inventors: Otto Airamo, Helsinki (FI); Ville Mattila, Helsinki (FI); Tuomo Syvänne, Helsinki (FI)

(73) Assignee: Forcepoint LLC, Austin, TX (US)

(*) Notice: Subject to any disclaimer, the term of this patent is extended or adjusted under 35 U.S.C. 154(b) by 247 days.

(21) Appl. No.: 15/968,962

(22) Filed: May 2, 2018

(65) Prior Publication Data

US 2019/0342263 A1 Nov. 7, 2019

(51) Int. Cl.
*H04L 29/06* (2006.01)
*H04L 29/12* (2006.01)
*H04L 29/08* (2006.01)
*H04L 9/14* (2006.01)

(52) U.S. Cl.
CPC ........... *H04L 61/2592* (2013.01); *H04L 9/14* (2013.01); *H04L 61/2517* (2013.01); *H04L 61/2535* (2013.01); *H04L 63/0428* (2013.01); *H04L 67/141* (2013.01); *H04L 67/2814* (2013.01); *H04L 69/161* (2013.01); *H04L 67/42* (2013.01)

(58) Field of Classification Search
CPC ............. H04L 61/2592; H04L 61/2517; H04L 61/2535; H04L 61/2524; H04L 69/161; H04L 69/22; H04L 67/2814; H04L 67/141; H04L 67/42; H04L 67/142; H04L 63/0428; H04L 9/14
See application file for complete search history.

(56) References Cited

U.S. PATENT DOCUMENTS

| | | | | |
|---|---|---|---|---|
| 6,704,786 B1* | 3/2004 | Gupta | ..................... | H04L 69/16 709/227 |
| 2002/0116397 A1* | 8/2002 | Berg | ................... | H04L 67/1008 |
| 2002/0116475 A1* | 8/2002 | Berg | ................... | H04L 69/165 709/219 |
| 2004/0225890 A1* | 11/2004 | Kang | .................... | H04L 63/061 713/193 |
| 2005/0055435 A1* | 3/2005 | Gbadegesin | .......... | H04L 67/101 709/224 |
| 2006/0167975 A1* | 7/2006 | Chan | ................... | H04L 67/2819 709/203 |
| 2007/0186100 A1* | 8/2007 | Wakameda | ....... | H04W 12/0808 713/160 |
| 2014/0195666 A1* | 7/2014 | Dumitriu | ................ | H04L 49/70 709/223 |
| 2015/0188949 A1* | 7/2015 | Mahaffey | .......... | H04W 12/0027 726/1 |
| 2017/0134239 A1* | 5/2017 | Mahoney | ................ | H04L 41/12 |

* cited by examiner

*Primary Examiner* — Khoi V Le
(74) *Attorney, Agent, or Firm* — Jackson Walker L.L.P.

(57) ABSTRACT

A method, system, and computer-usable medium are disclosed for responsive to a connection from a client to a server for establishing communications between the client and the server, store information regarding state of the connection and responsive to receiving a reply from the server to the client, route the reply to the client based on the information regarding the state of the connection.

18 Claims, 4 Drawing Sheets

ROUTE REPLY BACK INTERFACE FOR CLOUD INTERNAL COMMUNICATION

FIELD OF DISCLOSURE

The present invention relates in general to the field of computers and similar technologies, and in particular to software utilized in this field. Still more particularly, it relates to a method, system, and computer-usable medium for enabling a route reply back interface for cloud internal communication.

BACKGROUND

Cloud service providers and other network service providers may have multiple users connecting to services hosted by the service providers. Such users may connect to the service provider using different connection mechanisms, including an Internet Protocol Security (IPSec), Generic Routing Encapsulation (GRE) tunnel, direct Data Link Services (DLS) link, Multiprotocol Label Switching (MPLS) connection, or dedicated Ethernet/virtual local area network (VLAN) connection. Ideally, connections to cloud services originate from public and routable Internet Protocol (IP) addresses, where network topology and routing can be simply maintained inside cloud data centers. However, when a cloud service provider allows a user to communicate with the cloud service using an original client IP address, complexity may increase. Original IP addresses may be from private address space and different users connecting to a cloud may have overlapping addresses. For example, an original IP address of a client connection may have a certain value (e.g., 10.0.0.1), and at the same time, another client connection from another network tunnel may also have the same IP address and may connect to the same destination server. With traditional routing principles, it is not possible for a router to distinguish these two connections and route reply packets to the correct source client.

SUMMARY

In accordance with the teachings of the present disclosure, certain disadvantages and problems associated with existing approaches to network communication may be reduced or eliminated.

In accordance with embodiments of the present disclosure, a computer-implementable method for managing network communication may include, responsive to a connection from a client to a server for establishing communications between the client and the server, store information regarding state of the connection and responsive to receiving a reply from the server to the client, route the reply to the client based on the information regarding the state of the connection.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for, responsive to a connection from a client to a server for establishing communications between the client and the server, store information regarding state of the connection and responsive to receiving a reply from the server to the client, route the reply to the client based on the information regarding the state of the connection.

In accordance with these and other embodiments of the present disclosure, a non-transitory, computer-readable storage medium may embody computer program code, the computer program code comprising computer executable instructions configured for, responsive to a connection from a client to a server for establishing communications between a client and the server, store information regarding state of the connection and responsive to receiving a reply from the server to the client, route the reply to the client based on the information regarding the state of the connection.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregation of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a mobile device such as a tablet or smartphone, a connected "smart device," a network appliance, a network storage device, or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more communications ports for communicating with networked devices, external devices, and various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
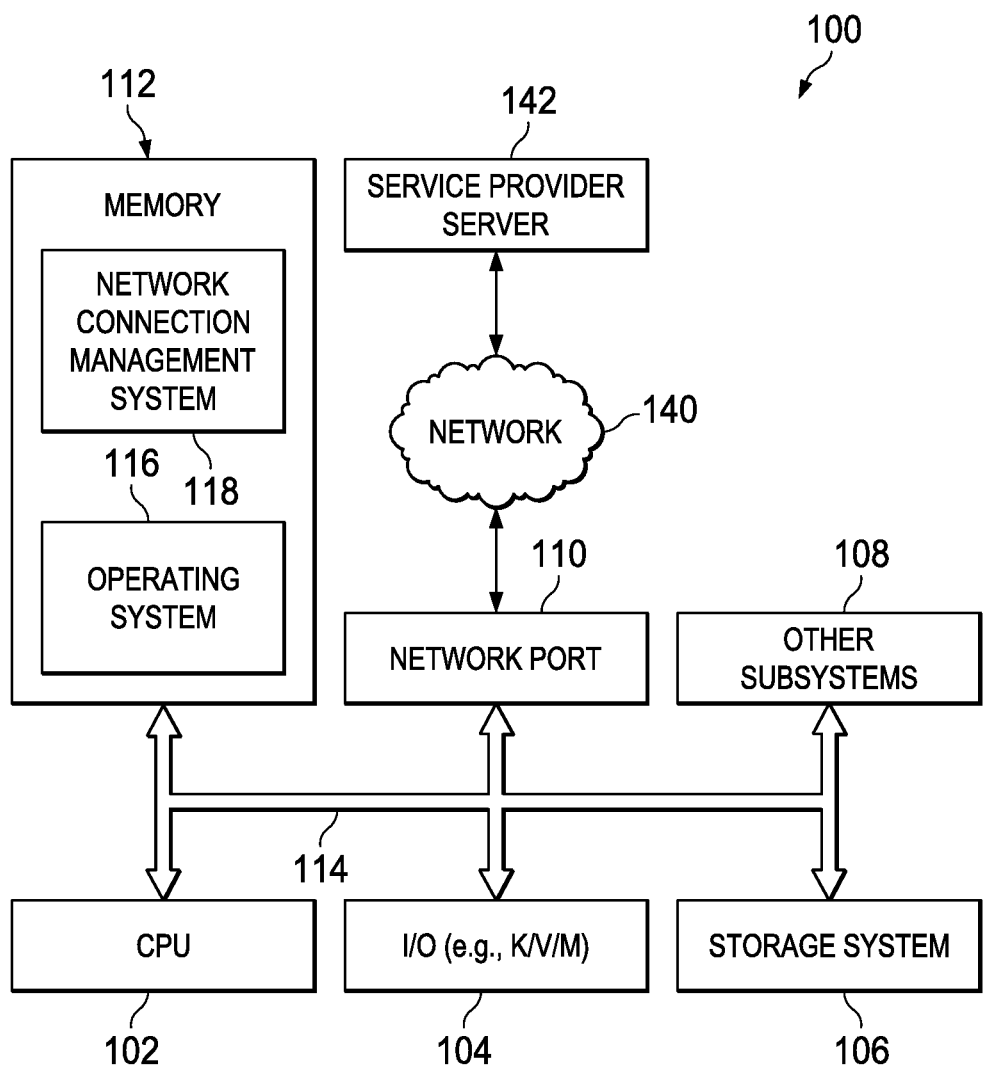
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a network connection management system 118. In some embodiments, information handling system 100 may be able to download network connection management system 118 from service provider server 142. In other embodiments, network connection management system 118 may be provided as a service from the service provider server 142.

Figure 2:
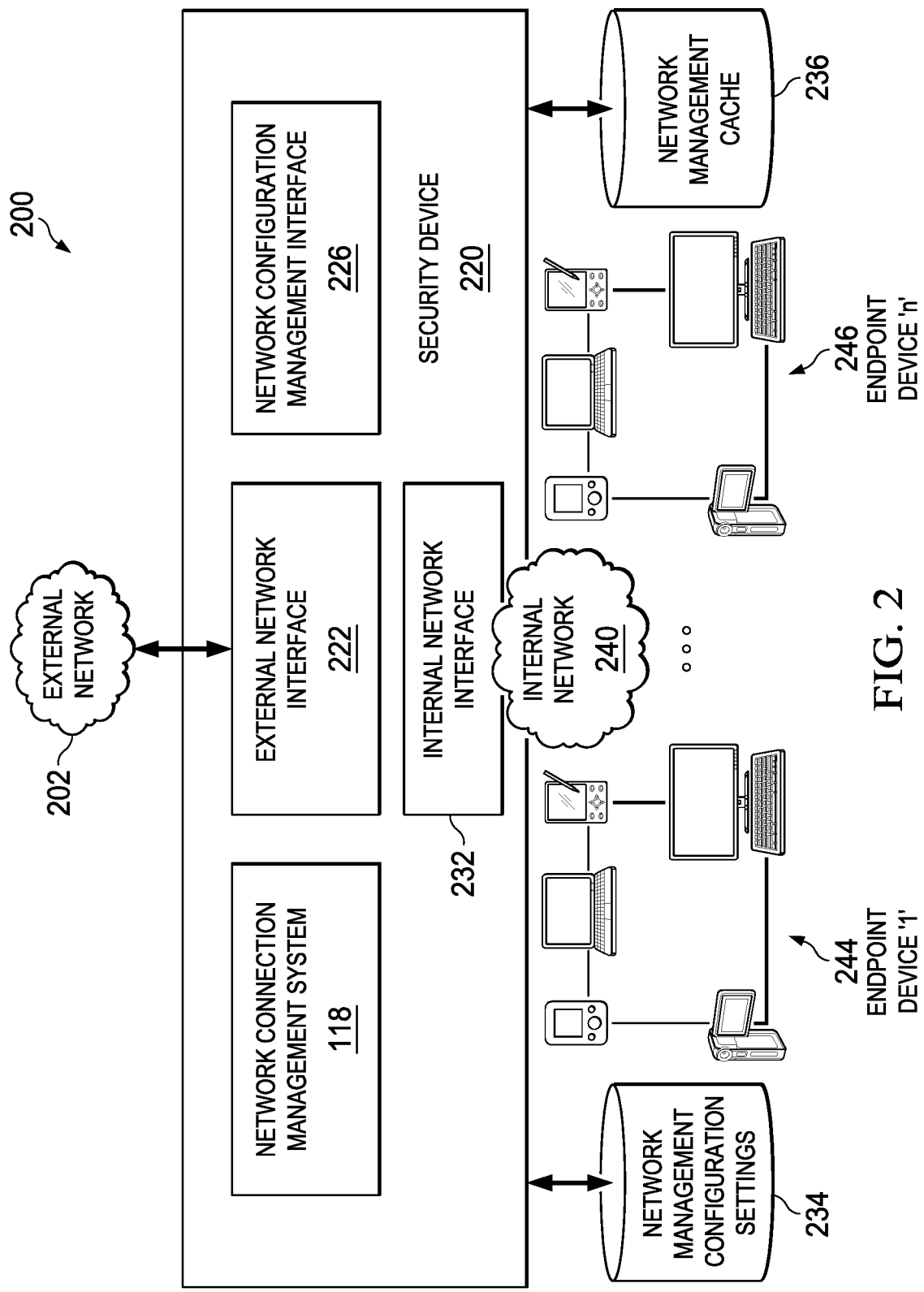
FIG. 2 illustrates a block diagram of a system for implementing a route reply back interface for cloud internal communication, in accordance with embodiments of the present disclosure.

In various embodiments, a network connection management system 118 may be configured to enable protocol independent forwarding of traffic to a content inspection service (e.g., within external network 202 or internal network 240 shown in FIG. 2) by injecting custom header information into a header (e.g., a Transport Communication Protocol (TCP) header) of each of one or more datagrams of traffic, as described in greater detail elsewhere in this disclosure. In particular, network connection management system 118 may be configured to, responsive to receipt of an attempted connection between a client device (e.g., an endpoint device 244 or 246 shown in FIG. 2) and a server within external network 202, redirect the connection to a proxy for performing the content inspection service and may inject custom header information into the beginning of the stream of traffic for the connection. Such custom header information may include Internet Protocol information, port information, and/or other information regarding the original connection (e.g., prior to redirection to the proxy). The custom header information may also include identifying information associated with the client device (e.g., source address, user information, key identifier, etc.) which may provide additional information for the proxy/content inspection service to apply security policy and/or routing for traffic of the connection. Further, network connection management system 118 may encrypt the injected header information using a user-specific key, which user-specific key may be identified by a user identifier, key identifier (e.g., that identifies a particular key from a plurality of keys associated with a user), and/or other suitable information, such that the proxy/content inspection service may apply a decryption key based on the user identifier, key identifier, and/or other suitable information in order to read the encrypted header information and apply appropriate security policy.

In various embodiments, a network connection management system 118 may implement a route reply back interface that operates at the border of a cloud network. When implementing a route reply back interface, a network connection management system 118 may bypass routing for reply packets in a connection from a client to a server. All connections that are opened via the route reply back interface may be network address translated based on a source address, as described in greater detail below.

In some embodiments, a network connection management system 118 and the functionality thereof may improve processor efficiency, and thus the efficiency of information handling system 100, by performing network security operations with greater efficiency and with decreased processing resources as compared to existing approaches for similar network security operations. In these and other embodiments, network connection management system 118 and the functionality thereof may improve effectiveness in ensuring network security and/or network routing, and thus the effectiveness of information handling system 100, by performing network security operations with greater effectiveness to existing approaches for similar network security operations. As will be appreciated, once information handling system 100 is configured to perform the functionality of network connection management system 118, information handling system 100 becomes a specialized computing device specifically configured to perform the functionality of network connection management system 118, and is not a general purpose computing device. Moreover, the implementation of functionality of a network connection management system 118 on information handling system 100 improves the functionality of information handling system 100 and provides a useful and concrete result of improving network communication by enabling reply route back interfaces in order to support connections to a server from identical private network addresses.

FIG. 2 illustrates a block diagram of a system 200 for implementing a route reply back interface for cloud internal communication, in accordance with embodiments of the present disclosure. In some embodiments, a security device 220 may include an external network interface 222, a network configuration management interface 226, an internal network interface 232, and a network connection management system 118. Security device 220 may be implemented using any suitable information handling system 100, including without limitation a gateway, a firewall, an intrusion prevention system, an intrusion detection system, or any other suitable security device capable of implementing network connection management system 118. In some embodiments, security device 220 may be implemented as an individual security device 220, a virtual context security device 220, or a security device 220 cluster.

Security device 220 may also include in some embodiments a repository of network management configuration settings 234 and a network management cache 236. In certain embodiments, network configuration management interface 226 may be implemented to receive instructions relating to network security policy decisions from network connection management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a personal digital assistant (PDA), a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

In operation, a network connection management system 118 may, responsive to receipt of an attempted connection between a client device (e.g., an endpoint device 244 or 246) and a server within external network 202, inject custom header information into the beginning of the stream of traffic for the connection. Such custom header information may include Internet Protocol information, port information, and/or other information regarding the original connection (e.g., prior to redirection to the proxy). The custom header information may also include identifying information associated with the client device (e.g., source address, user information, key identifier, etc.) which may provide additional information for a proxy/content inspection service to apply security policy for traffic of the connection. Also, such custom header information may be used by a route reply back interface to maintain connectivity between a server and two or more client devices with identical private network addresses. Further, network connection management system 118 may encrypt the injected header information using a user-specific key, which user-specific key may be identified by a user identifier, key identifier, and/or other suitable information, such that the proxy/content inspection service may apply a decryption key based on the user identifier, key identifier, and/or other suitable information in order to read the encrypted header information and apply appropriate security policy. Network connection management system 118 may also include functionality such as that described with respect to method 300, described in detail below.

Figure 3:
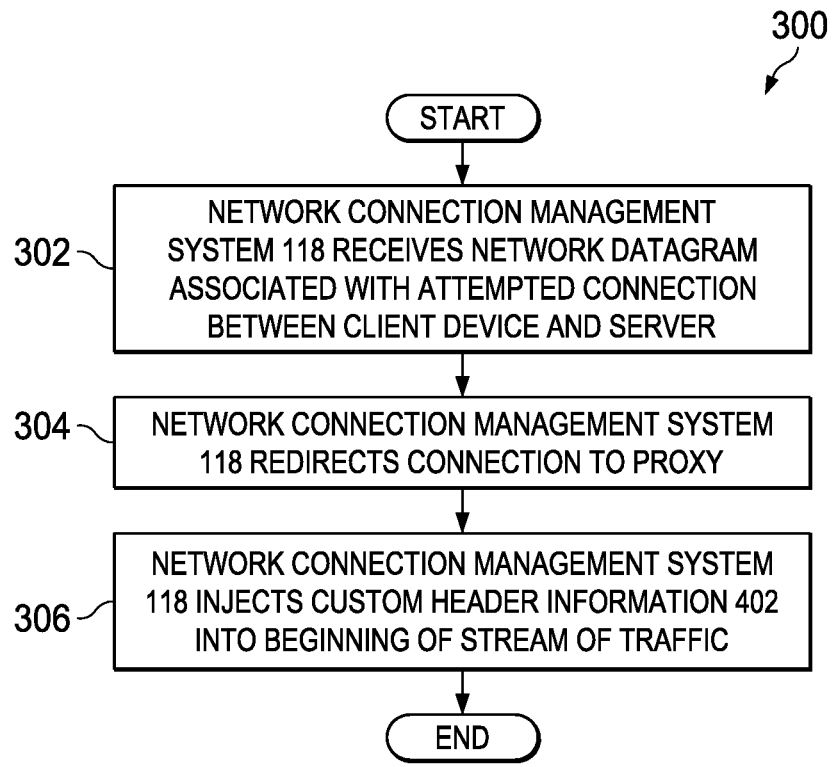
FIG. 3 illustrates a flow chart of an example method for injecting custom header information into the beginning of the stream of traffic for the connection, in accordance with embodiments of the present disclosure.

FIG. 3 illustrates a flow chart of an example method 300 injecting custom header information into the beginning of the stream of traffic for the connection, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

Figure 4:
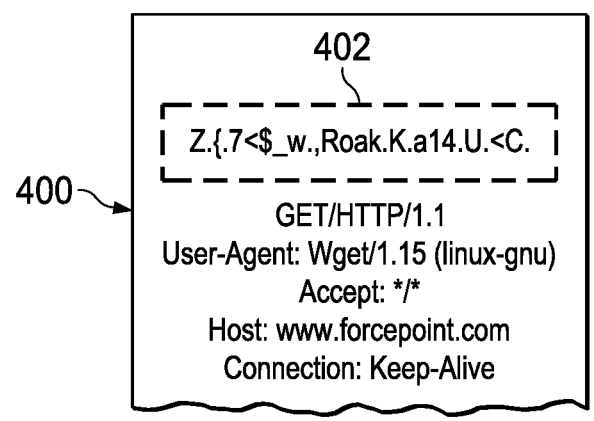
FIG. 4 illustrates an example Transport Communication Protocol (TCP) header of a datagram of traffic, in accordance with embodiments of the present disclosure.

FIG. 4 illustrates an example TCP header 400 of a datagram of traffic, in accordance with embodiments of the present disclosure. FIG. 4 and example TCP header 400 are discussed along with FIG. 3 and method 300 to further illustrate operation of method 300.

At step 302, network connection management system 118 may receive a network datagram associated with an attempted connection between a client device (e.g., an endpoint device 244 or 246) and a server within external network 202. At step 304, network connection management system 118 may redirect the connection to a proxy for performing a content inspection service and/or other security task. In some embodiments, such redirection may include applying a source network address table for outgoing connections, which may hide a source address, to the client device of the original connection.

At step 306, network connection management system 118 may inject custom header information 402 into the beginning of the stream of traffic for the connection as depicted in FIG. 4. Such custom header information may include Internet Protocol information, port information, and/or other information regarding the original connection (e.g., prior to redirection to the proxy). The custom header information may also include identifying information associated with the client device (e.g., source address, user information, key identifier, etc.) which may provide additional information for the proxy/content inspection service to apply security policy for traffic of the connection. Further, network connection management system 118 may encrypt the injected header information using a user-specific key, which user-specific key may be identified by user identifier, key identifier, and/or other suitable information, such that the proxy/content inspection service may apply a decryption key based on the user identifier, key identifier, and/or other suitable information in order to read the encrypted header information and apply appropriate security policy.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, network connection management system 118 executing thereon, and/or any other system operable to implement method 300. In certain embodiments, method 300 may be implemented partially or fully in software and/or firmware embodied in computer-readable media.

In the foregoing discussion, a network management system 118 may reside on a gateway, firewall, or similar device within a network system 200 in order to perform injection of custom header information into the beginning of the stream of traffic for the connection. However, when used to implement a route reply back interface, a network management system 118 may reside on the border of a cloud network, such as a wide area network (WAN) or cloud interface 506 shown in FIG. 5 below.

Figure 5:
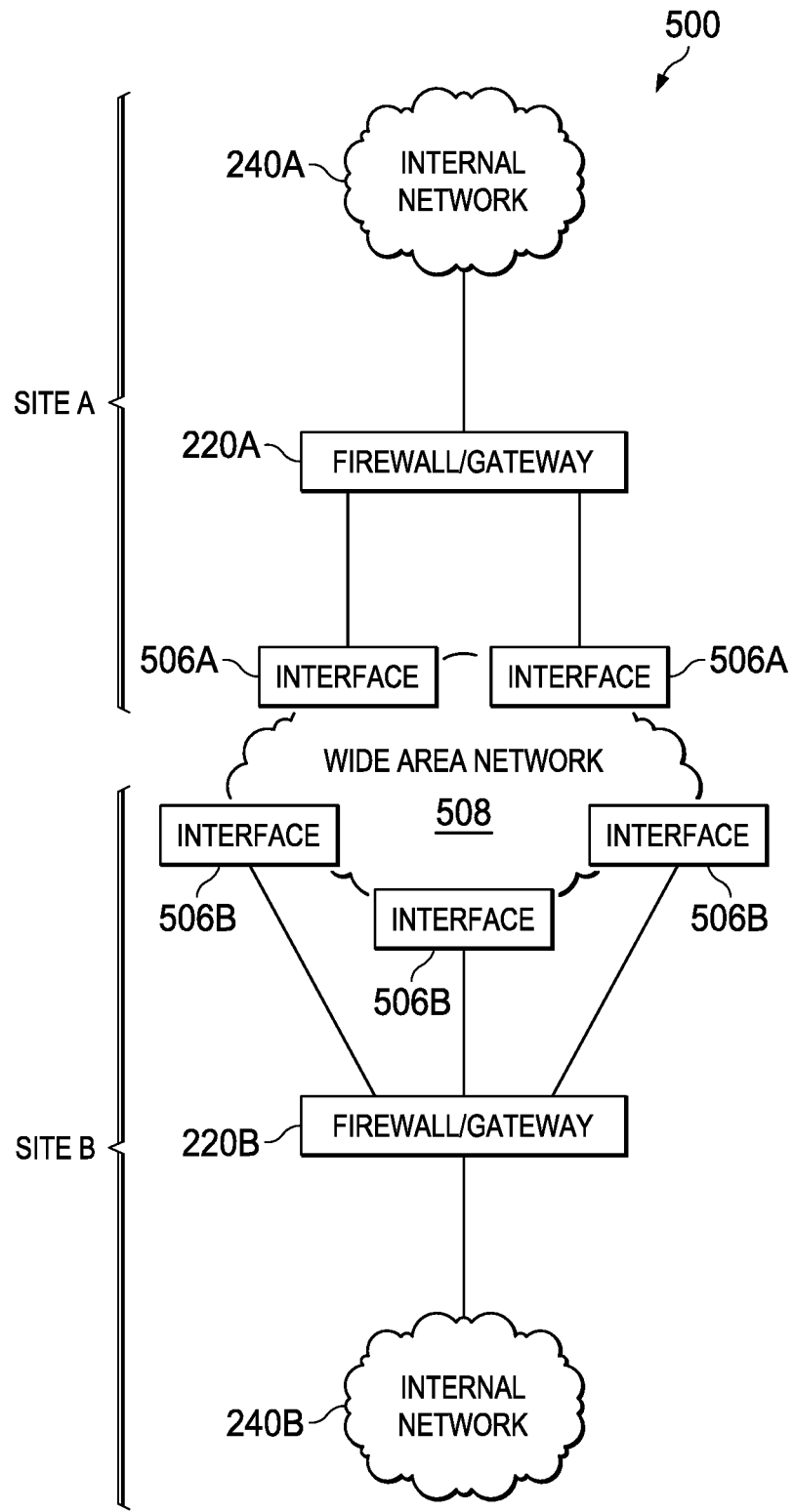
FIG. 5 illustrates a block diagram of an example network, in accordance with embodiments of the present disclosure.

FIG. 5 illustrates a block diagram of an example network 500 in which a route reply back interface may be implemented, in accordance with embodiments of the present disclosure. As shown in FIG. 5, network 500 may include a first site labeled as site A that may include internal network 240A, a security device 220A, and one or more interfaces 506A. Network 300 may similarly include a second site labeled as site B that may include internal network 240B, a firewall/gateway 220B, and one or more interfaces 506B. Interfaces 506A may be coupled to interfaces 506B via a WAN 308. In some embodiments, WAN 308 may comprise the Internet and interfaces 506A and 506B may comprise Internet service providers (ISPs). In other embodiments, WAN 508 may comprise a multiple-protocol label switching network, a network of leased lines, or any other suitable network.

Each of internal network 240A and 240B may include an instance of an internal network 240 of FIG. 2, and thus, may include one or more endpoint devices of which network devices 244 and 246 are examples. In addition, each of firewall/gateway 220A and 220B may include an instance of a firewall/gateway 220 of FIG. 2, and thus, may implement or otherwise include an instance of a network connection management system 118. Although FIG. 5 illustrates one possible topology for network 500 which is configured as a multi-interface (e.g., multi-ISP) VPN, network 500 may be implemented in other topologies, including those in which one or both of sites A and B include only a single interface 506A/506B, and/or including those in which a cluster of firewalls/gateways 220A/220B is used in lieu of a single firewall/gateway 220A/220B.

In operation, skilled practitioners in the art may recognize that the various components of network 500 may be used to implement secured multi-link communication between a single endpoint within internal network 240A and a single endpoint within internal network 240B, in that communication between the single endpoint of network 240A and the single endpoint of network 240B may be simultaneously routed over multiple links of wide area network 508 in order to provide communication with high availability and high bandwidth.

In operation, an interface 506 may comprise an information handling system 100 in which a network connection management system 118 thereof implements a route reply back interface. As so implemented, a route reply back interface may operate to bypass all routing for reply packets for the connection from a client to a server. For example, an original IP address of a client connection may have a certain value (e.g., 10.0.0.1), and at the same time, another client connection from another network tunnel may also have the same IP address and may connect to the same destination server. However, in some instances as noted below, a route reply back interface may perform network address translation of traffic between a client and a server, so that it is possible for an interface device 306 to distinguish from reply packets from server to client which connections such packets belong to, and route such replies to the correct client.

To implement a route reply back interface, an interface 506 may be configured to store state of a connection when a first packet or other datagram of the connection arrives at the route reply back interface. For example, such state may be stored by storing the usage of the route reply back interface and a source interface of the connection in a state table of interface 506 along with among other connection information (e.g., protocol, source IP address, and port), such that the route reply back interface may route a reply packet to the first packet to the correct interface without using normal routing based on the connection information. Such connection information may be stored in a table, list, array, or other data structure maintained by a route reply back interface that maps identifiable information regarding a connection (e.g., e.g., protocol, source IP address, and port) to an appropriate client tunnel.

However, when there are two or more clients from several route reply back interfaces connecting using identical protocol, source IP address, and port, a route reply back interface may perform source (e.g., client) address-based network address translation, as described in greater detail below, and such network address translation may be stored to the state information of the connection in order to distinguish reply packets and route each reply packet to correct interface. Similarly, related connections such as Internet Control Message Protocol (ICMP) error messages and File Transfer Protocol data connections may be handled with route reply back interfaces. For example, destination/port unreachable or similar error messages may be routed by a route reply back interface to a correct interface as an ICMP error message may be matched to original connection from state table and routed to correct interface.

As mentioned above, in some situations (e.g., when there are two or more clients from several route reply back interfaces connecting using identical protocol, source IP address, and port), a route reply back interface may perform source (e.g., client) address-based network address translation, as described in greater detail below. In such situations, a first connection from a first client of a first connection tunnel with a particular private network address may have its private network address translated into a network address specific to the first connection tunnel, while a second connection from a second client of a second connection tunnel with the same private network address may have its private network address translated into a network address specific to the second connection tunnel. Thus, as replies are returned to the route reply back interface, the route reply back interface may route the replies to the appropriate tunnel, and accordingly, the correct client.

Such network address translation may be implemented by a table, list, array, or other data structure maintained by a route reply back interface that maps identifiable information regarding a client tunnel connection (e.g., ingress network port, network protocol of tunnel, etc.) to a translated client network address, such that server replies directed to the translated client network address may be routed to the appropriate client tunnel.

In some embodiments, route reply back interfaces may be used without the injection of custom header information described above with respect to FIGS. 3 and 4. In such embodiments, an original connection network address may be hidden, but a key benefit may be simplified networking inside a cloud data center which may render load balancing and routing inside a cloud network easier and more efficient. Such improvements, however, may come with the tradeoff of losing original network address information and a possible mapping from network addresses to users.

However, in other embodiments, route reply back interfaces may be used with the injection of custom header information described above with respect to FIGS. 3 and 4. With the use of injected custom header information, user information can be communicated as part of the customer header information even when the source network address of original connection is modified by the route reply back interface.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A computer-implemented method for managing network communication, comprising:
    in response to a connection from a client to a server for establishing communications between the client and the server, storing information regarding state of the connection;
    translating a client network address of the connection into a trans late d client network address based on identifying characteristics of a network tunnel through which the connection is established so as to distinguish the client from another client with the same client network address connecting to the server through another network tunnel;
    in response to receiving a reply from the server to the client, routing the reply to the client via the translated client network address based on the information regarding the state of the connection; and
    injecting protocol-independent header information into a datagram of the traffic between the client and the server, the protocol-independent header information including identifying information of the client, wherein the protocol-independent header information within the datagram is encrypted with a user-specific key.

2. The method of claim 1, wherein the information regarding the state of the connection comprises an indication that a route reply back interface is being used for the connection and a source interface of the connection.

3. The method of claim 2, wherein the information regarding the state of the connection includes information regarding a protocol, source address, and source port of the connection.

4. The method of claim 1, further comprising:
    storing information regarding the translated client network address as part of the information regarding state of the connection.

5. The method of claim 1, wherein the user-specific key is defined by user-specific information within the protocol-independent header information, such that the user-specific information may be used to decrypt encrypted protocol-independent header information.

6. The method of claim 5, wherein encrypting the protocol-independent header information with the user-specific key comprises encrypting the protocol-independent header information with a key selected from a plurality of keys associated with a user, wherein the user-specific key selected from the plurality of keys is defined by a key identifier associated with the user within the protocol-independent header information.

7. A system comprising:
    a processor; and
    a non-transitory, computer-readable storage medium embodying computer program code comprising instructions executable by the processor and configured for:
    responsive to a connection from a client to a server for establishing communications between the client and the server, storing information regarding state of the connection;
    translating a client network address of the connection into a translated client network address based on identifying characteristics of a network tunnel through which the connection is established so as to distinguish the client from another client with the same client network address connecting to the server through another network tunnel;
    responsive to receiving a reply from the server to the client, routing the reply to the client via the translated client network address based on the information regarding the state of the connection; and
    injecting protocol-independent header information into a datagram of the traffic between the client and the server, the protocol-independent header information including identifying information of the client, wherein the protocol-independent header information within the datagram is encrypted with a user-specific key.

8. The system of claim 7, wherein the information regarding the state of the connection comprises an indication that a route reply back interface is being used for the connection and a source interface of the connection.

9. The system of claim 8, wherein the information regarding the state of the connection includes information regarding a protocol, source address, and source port of the connection.

10. The system of claim 7, the instructions for further:
    storing information regarding the translated client network address as part of the information regarding state of the connection.

11. The system of claim 7, wherein the user-specific key is defined by user-specific information within the protocol-independent header information, such that the user-specific information may be used to decrypt encrypted protocol-independent header information.

12. The system of claim 11, wherein encrypting the protocol-independent header information with the user-specific key comprises encrypting the protocol-independent header information with a key selected from a plurality of keys associated with a user, wherein the user-specific key selected from the plurality of keys is defined by a key identifier associated with the user within the protocol-independent header information.

13. A non-transitory, computer-readable storage medium embodying computer program code, the computer program code comprising computer executable instructions configured for:
    responsive to a connection from a client to a server for establishing communications between the client and the server, storing information regarding state of the connection;
    translating a client network address of the connection into a trans late d client network address based on identifying characteristics of a network tunnel through which the connection is established so as to distinguish the client from another client with the same client network address connecting to the server through another network tunnel;

responsive to receiving a reply from the server to the client, routing the reply to the client via the translated client network address based on the information regarding the state of the connection; and injecting protocol-independent header information into a datagram of the traffic between the client and the server, the protocol-independent header information including identifying information of the client, wherein the protocol-independent header information within the datagram is encrypted with a user-specific key.

14. The computer-readable storage medium of claim 13, wherein the information regarding the state of the connection comprises an indication that a route reply back interface is being used for the connection and a source interface of the connection.

15. The computer-readable storage medium of claim 14, wherein the information regarding the state of the connection includes information regarding a protocol, source address, and source port of the connection.

16. The computer-readable storage medium of claim 13, the instructions for further:

storing information regarding the translated client network address as part of the information regarding state of the connection.

17. The computer-readable storage medium of claim 13, wherein the user-specific key is defined by user-specific information within the protocol-independent header information, such that the user-specific information may be used to decrypt encrypted protocol-independent header information.

18. The computer-readable storage medium of claim 17, wherein encrypting the protocol-independent header information with the user-specific key comprises encrypting the protocol-independent header information with a key selected from a plurality of keys associated with a user, wherein the user-specific key selected from the plurality of keys is defined by a key identifier associated with the user within the protocol-independent header information.

* * * * *